(No Model.)
J. GREEN.
HARNESS TUG HOOK.
No. 483,959. Patented Oct. 4, 1892.
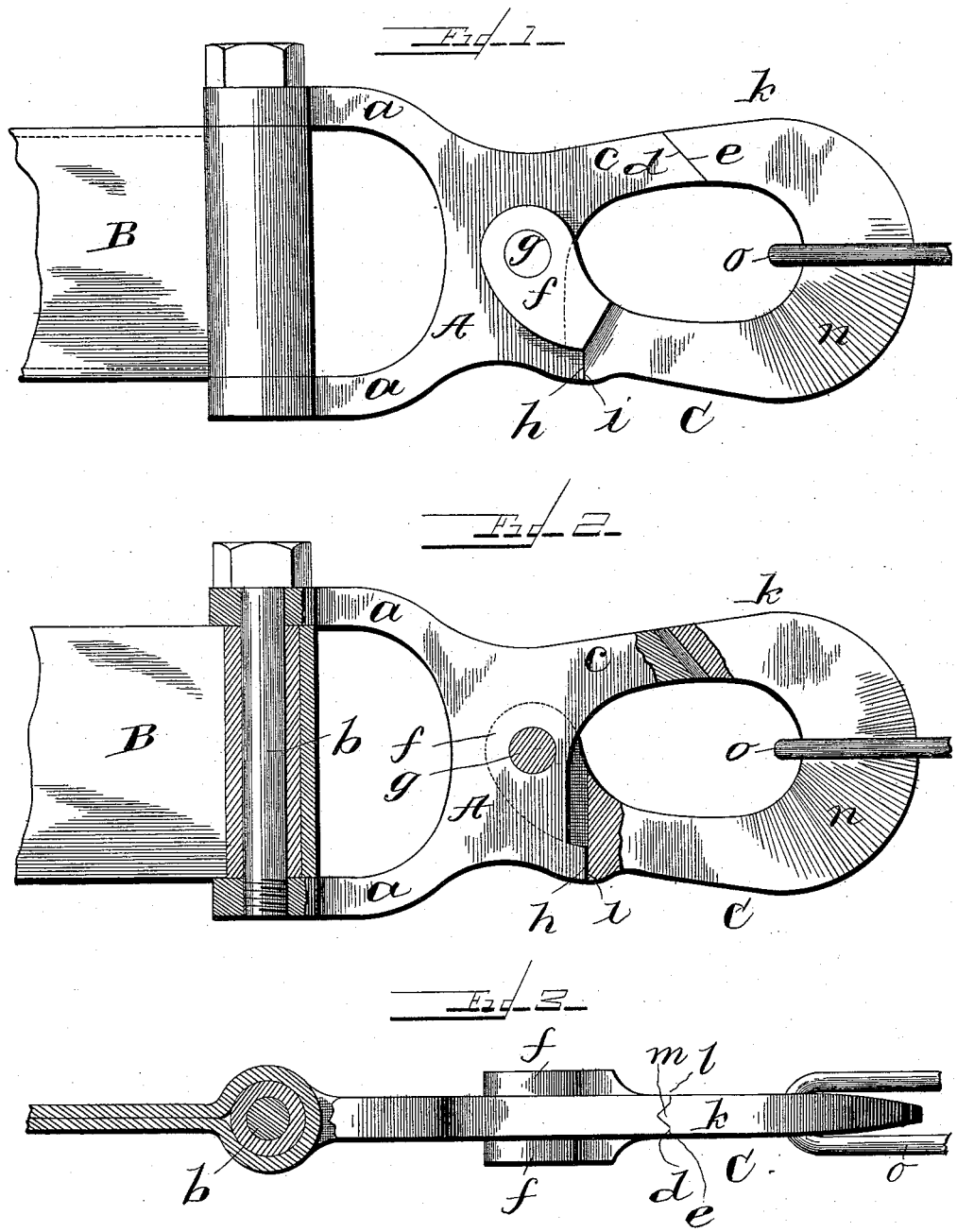

UNITED STATES PATENT OFFICE.

JOHN GREEN, OF RENOVO, PENNSYLVANIA, ASSIGNOR OF TWO-THIRDS TO SAMUEL M. ENGLISH AND ANDERS E. STAGREN, OF SAME PLACE.

HARNESS TUG-HOOK.

SPECIFICATION forming part of Letters Patent No. 483,959, dated October 4, 1892.

Application filed June 23, 1892. Serial No. 437,756. (No model.)

*To all whom it may concern:*

Be it known that I, JOHN GREEN, a citizen of the United States, residing at Renovo, in the county of Clinton and State of Pennsylvania, have invented certain new and useful Improvements in Harness Tug-Hooks; and I do hereby declare the following to be a full, clear, and exact description of the invention, such as will enable others skilled in the art to which it appertains to make and use the same.

My present invention relates to harness and has especial reference to tug-hooks; and it consists in certain improvements in construction, which will be fully disclosed in the following specification and claim.

In the accompanying drawings, which form part of this specification, Figure 1 represents a side elevation; Fig. 2, a like view, partly in section; and Fig. 3, a top plan view.

Reference being had to the drawings and the letters thereon, A indicates a clevis provided with the usual arms $a\ a$, extending rearwardly, and a bolt $b$, to which the end of the tug B is attached, a forwardly-projecting horn $c$ on the upper side extending beyond the short arm $c'$ and having an inclined end $d$, in which is formed a recess or groove $e$, preferably V-shaped, as shown.

C indicates a hook having jaws or lugs $f\ f$, by which the hook engages the clevis and is secured thereto by a pin $g$, which passes through the jaws and the clevis. On the lower side of the clevis is a short arm $c'$, forming a stop or seat $h$, against which abuts a vertical stop $i$ on the lower side of the rear end of the hook, and the beak $k$ of the hook is provided with an inclined end $l$ and a projection $m$, which correspond and engage with the end $d$ and recess $e$ of the horn $c$ of the clevis.

The shoulders $h\ i$ on the lower side of the clevis and the hook and the bearing afforded by the contiguous surfaces of the horn $c$ and the hook take up part of the strain usually borne by the pin $g$, and the projection $m$ and recess $e$ on the ends of the horn $c$ and the hook C prevent any lateral movement of the hook or strain on the jaws $f\ f$.

The hook is weighted at $n$ to keep the hook closed to prevent accidental releasing and cause the hook to seat itself automatically in the event it is raised by any cause, such as contact with brush or undergrowth in woods.

It will be observed that the horn $c$ extends forward considerably beyond the point at which the hook is pivoted to the clevis, so that the link or ring of the chain $o$ cannot become detached when slackened, as frequently occurs in trailing logs.

Having thus fully described my invention, what I claim is—

A hook consisting of two members, one of which is provided with attaching means, a short arm on its lower side forming a stop or seat for the hook to abut, and a horn on the upper side extending beyond said arm and having an inclined end and a groove therein, the hook member being pivoted thereto on the under side and provided with a vertical stop or seat at its rear end, resting normally against said arm, and a projection on the end of the beak to engage the groove in said horn.

In testimony whereof I affix my signature in presence of two witnesses.

JOHN GREEN.

Witnesses:
D. C. REINOHL,
H. B. REINOHL.